(12) United States Patent
Butt et al.

(10) Patent No.: US 8,780,475 B2
(45) Date of Patent: Jul. 15, 2014

(54) TAPE DRIVE BUFFER UTILIZATION

(75) Inventors: Kevin Dale Butt, Tucson, AZ (US); Paul Merrill Greco, Tucson, AZ (US); Tajashi Katagiri, Yokohama (JP); Yuhjo Mori, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 13/599,644

(22) Filed: Aug. 30, 2012

(65) Prior Publication Data

US 2014/0063634 A1    Mar. 6, 2014

(51) Int. Cl.
| | | |
|---|---|---|
| *G11B 5/09* | (2006.01) | |
| *G11B 5/02* | (2006.01) | |
| *G06F 3/00* | (2006.01) | |
| *G06F 5/00* | (2006.01) | |

(52) U.S. Cl.
USPC ................................ 360/48; 360/55; 710/52

(58) Field of Classification Search
None
See application file for complete search history.

(56) References Cited

U.S. PATENT DOCUMENTS

| | | | | |
|---|---|---|---|---|
| 5,200,864 A | * | 4/1993 | Dunn et al. ...................... | 360/48 |
| 6,330,640 B1 | * | 12/2001 | Williams et al. ............... | 711/112 |
| 7,350,021 B2 | * | 3/2008 | Itagaki et al. .................. | 711/111 |
| 2009/0287982 A1 | | 11/2009 | Kabelac et al. | |
| 2010/0085656 A1 | | 4/2010 | Mojica | |
| 2011/0122522 A1 | | 5/2011 | Itagaki et al. | |
| 2011/0292531 A1 | | 12/2011 | Sato | |

FOREIGN PATENT DOCUMENTS

| | | |
|---|---|---|
| JP | 02003173656 A | 6/2003 |
| JP | 3870215 B1 | 1/2007 |
| JP | 2010257523 A | 11/2010 |

OTHER PUBLICATIONS

Zhang, X et al; "A High Performance Tape File System"; In Proceedings of the 14th NASA Goddard Conference on Mass Storage Systems and Technologies/23th IEEE Symposium on Mass Storage Systems (MSST2006), pp. 275-288, May 15-18, 2006, College Park, Maryland USA.

Childlow, S et al; "Storage Area Networks"; JISC Technology and Standards Watch, Nov. 2003. JISC: Bristol, UK. http://www.jisc.ac.uk/whatwedo/services/techwatch/reports/horizonscanning/hs0307.aspx.

* cited by examiner

*Primary Examiner* — Regina N Holder

(74) *Attorney, Agent, or Firm* — Griffiths & Seaton PLLC

(57) ABSTRACT

Records and filemarks read from data segments are aggregated into at least one single data segment. The records and the filemarks are reorganized and restructured in the single data segment such that buffer utilization is improved.

24 Claims, 5 Drawing Sheets

TAPE DRIVE BUFFER UTILIZATION

FIELD OF THE INVENTION

The present invention relates in general to computers, and more particularly to improving the utilization of tape drive buffers by aggregating records and filemarks into a single data segment during read operations.

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives and tape drives. Tape, such as magnetic tape, provides for physically storing data which may be archived or which may be stored in storage shelves of automated data storage libraries, and accessed when required.

SUMMARY OF THE DESCRIBED EMBODIMENTS

In one embodiment, a method is provided improving tape drive efficiency. Records and filemarks read from data segments are aggregated into at least one single data segment. The records and the filemarks are reorganized and restructured in the single data segment such that buffer utilization is improved.

In another embodiment, a computer system is provided for improving tape drive efficiency. The computer system includes a computer-readable medium and a processor in operable communication with the computer-readable medium. The processor dynamically aggregates records and filemarks that are read from data segments into at least one single data segment. The records and the filemarks are reorganized and restructured in the single data segment such that buffer utilization is improved.

In a further embodiment, a computer program product is provided for improving tape drive efficiency. The computer-readable storage medium has computer-readable program code portions stored thereon. The computer-readable program code portions include a first executable portion that aggregates records and filemarks that are read from data segments into at least one single data segment. The records and the filemarks are reorganized and restructured in the single data segment such that buffer utilization is improved.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
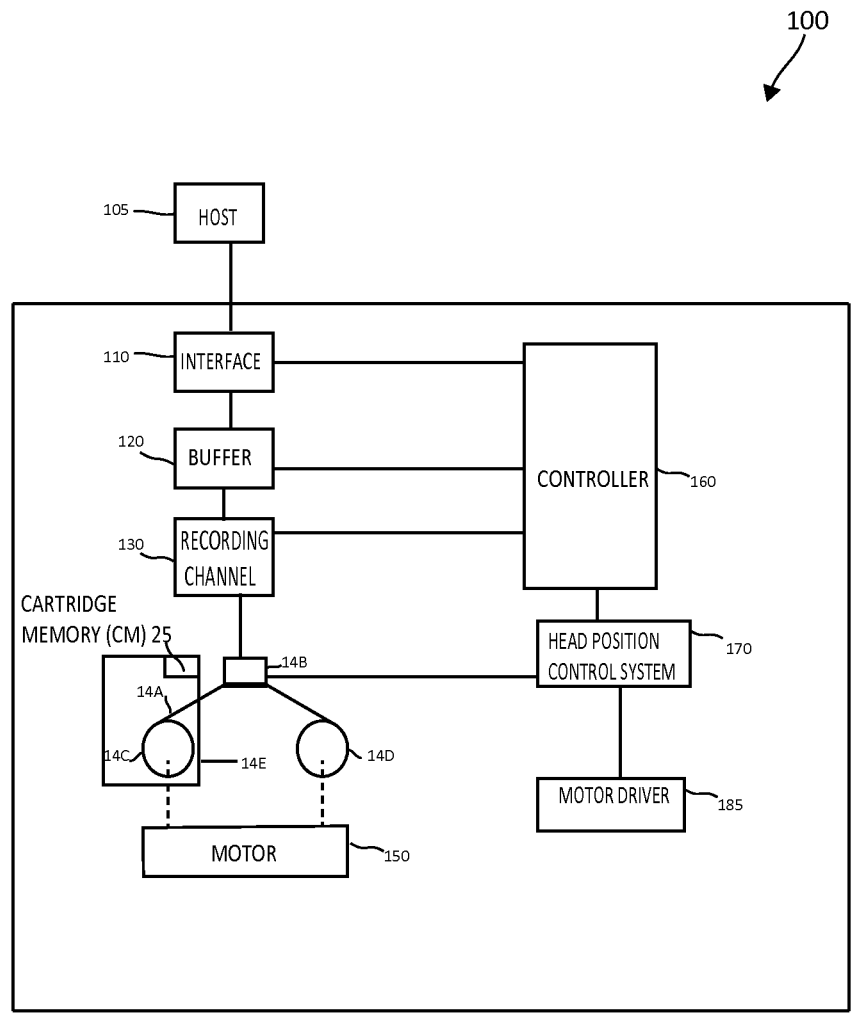
FIG. 1 is a block diagram of an exemplary embodiment of tape drive system in which aspects of the present invention may be realized.

With increasing demand for faster, more powerful and more efficient ways to store information, optimization of storage technologies is becoming a key challenge, particularly in tape drives. In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

An application for the tape device also has a small catalog data written at a beginning of partition (BOP). The application/usage is an asynchronously accessed volume so that multiple hosts may read and access the tapes without a central software (e.g., central software that could keep a copy of the catalog). A typical read/access operation is to locate to the BOP, read the catalog, then locate the data desired to be read, and then read the data. This creates a significant amount of "back and forth" traffic (e.g., BOP motion) if multiple hosts attempt to simultaneously access the tape. To improve the performance of the amount of "back and forth" traffic (e.g., BOP motion), tape drives may keep a small catalog at the BOP as cache, when the tape is loaded. Even though a host access process is to locate the BOP, read the catalog, and then locate the data, the cache for a small catalog eliminates the tape motion to "locate to the BOP" and "locate to the data from BOP." The cache for the BOP has a significant advantage to this application/usage.

When a host writes/reads data to a tape drive, the unit to be transferred to/from tape drive from/to host is recorded and is standardized by SCSI command. For a Linear Tape Open (LTO) format, multiple records are compressed and chunked to the fixed size unit=DS (DataSet) (e.g. 3 MB) to write/read to/from the tape. The small catalog consists of a number of records and/or filemarks, such as 2 sets of 80 bytes record and filemark (filemark is a tag which is inserted by Write Filemark command in SCSI). When the application writes a small catalog to the tape at the BOP, the application issues these 2 sets of records and filemarks by SCSI write and Write Filemark (WriteFM) commands. The content of datasets to be written will be different by the option of Write Filemark command. Write Filemark command has the option (immediate and non-immediate). When non-immediate is specified, the tape drive flushes all of the unwritten data into a buffer. When immediate is specified, the filemark will be added followed by the previous record. In other words, the image of small catalog to be written to the tape will be varied by the option of a Write Filemark command. For example, consider the two following examples, as further illustrated in FIG. 5.

Sample #1:
Write 80 bytes, WriteFM 1 (non-immed), Write 80 bytes, WriteFM 1 (non-immed)<------------DS#1------------> <------------DS#2------------> <REC#0> <FM> <------- Pad------>> <REC#1> <FM> <-------Pad------->

Sample #2:
Write 80 bytes, WriteFM 1(immed), Write 80 bytes, WriteFM 1(immed), WriteFM 0 (non-immed)<------------ DS#------------> <REC#0> <FM> <REC#1> <FM> <--Pad->, where the "Pad" in the above illustration means padding. When a non-immediate option is specified, the tape drive needs to flush all of unwritten data to the tape, even though DS is not fully filled by a record or filemark, since the LTO formats need to write the dataset on the tape. The sample #1 case means that the small catalog will be written to the DS#1 and DS#2. A straight forward implementation of hardware is a buffer on the drive is divided by dataset size and it constructs a ring buffer, as described in FIG. 2, below. With this implementation, if the full image of datasets are kept, which contains the small catalog, then 2 times (e.g., 2 x's) the dataset size area is required on the drive buffer. There is a high penalty to keep 2 times (e.g., 2 x's) the dataset in the drive buffer to maintain merely just 80 times 2 (e.g., 80*2) bytes and 2 times (e.g., 2 x's) filemark (1 filemark=4 bytes).

Thus, to improve the utilization of tape drive buffers, in one embodiment, the present invention provides a solution for improved utilization of tape drive buffers by aggregating records and filemarks into a single data segment during read operations from multiple datasets when multiple datasets are read from tape. Then the present invention contributes the utilization of the buffer area to keep multiple dataset that are padded as cache. In one embodiment, aggregating the records and filemarks from multiple datasets when a dataset is read from tape may contribute to another case (e.g., a different case from the cache for BOP). For example, if multiple datasets are padded (e.g, if a host application issues a WriteFM command with non-immediate option frequently to ensure the transferred data is written to the tape), the utilization of a buffer will be worse by padding the area. However, by performing the aggregation, the utilization of the buffer will be improved. The tape drive more efficiently is enabled to find the target record (which the host application wants to read) in the buffer much more than a straight forward implementation, as described above. For example, assume a DS size is 3 MB and the buffer size is 300 MB. With the aggregation process, the tape drive may store the 100 datasets on buffer. If a dataset only contains 1 times (e.g. 1*) 1 MB records, the drive may immediately (without tape motion) return 100 records (100 MB) to the host that are available in the drive buffer. However, if the proposal method is available (e.g., records are aggregated in a single dataset as much as possible when the drive read from tape) and 1 dataset contains 3*1 MB, the tape drive can immediately return 3*1*100 records (300 MB).

As mentioned, the records and filemarks are aggregated from multiple padded datasets and the records and filemarks are stored on the drive buffer as single dataset image. In other words, the records and the filemarks are sequentially aggregated into at least one single data segment. The single data segment is then padded, but the padding is less than the padded data of the multiple datasets. For example, if the end of the single data segment is padded, than the padding of the data in single data segment is less than the padding of the records and the filemarks in the multiple data segments. For example, the aggregation of the present invention described herein may be based on the LTO format. In one embodiment, the records and filemarks are not aggregated into single datasets if the attributes for encryption data of each of the records are not same. For example, the LTO format does not allow the multiple records and filemarks to be aggregated if the attributes of encryption are different. When the 2 padded datasets are read from tape (e.g., DS#N=Plain and DS#N+1=Encrypted), the attributes are not the same. In such a scenario, the present invention does not aggregate these datasets to a single dataset image. In other words, if during the process of aggregating the records and the filemarks into the single data set, several of the records and the filemarks contain attributes that are different than the previous sequentially aggregated records and/or filemarks, than the present invention may aggregate the records and the filemarks having the different attributes (e.g, different attributes for encryption data) into an alternative single data segment. Thus, each single data segment contains only the records and filemarks that are read from the multiple data sets, that have the same attributes (e.g., the same attributes of encryption). The present invention also aggregates only on read operations on the tape. Moreover, if the single data segment has reached a full capacity while aggregating, an additional single data segment may be added for continuing the aggregating the records and the filemarks.

FIG. 1 is a block diagram of an exemplary embodiment of tape drive system 100 in which aspects of the present invention may be realized. While one specific implementation of a tape drive is shown in FIG. 1, it should be noted that the embodiments described herein may be implemented in the context of any type of tape drive system. The tape drive 100 includes a tape 14a, a head 14b, reels 14c and 14d, a cartridge 14e having a cartridge memory (CM) 25, a motor 150, a controller 160, ahead position control system 170 and a motor driver 185. As shown, the tape drive 100 includes an interface 110 for communicating with the host 105, a controller (including at least one processor device) 160 for controlling many functions of the drive 100, and a buffer 120 for storing data. The host 105 communicates with the interface 110 via known interface standards. For example, a communication standard employed between the host 105 and interface 110 may be Small Computer System Interface (SCSI). When the SCSI standard is employed, the writing/reading of data to the buffer 120 corresponds to a write and/or read command and the writing and/or reading of data from the buffer to the tape corresponds to a write Filemark (FM) or Synchronous Request (Sync) command. The host 105 transmits commands to the tape drive 100 via the interface 110 for reading and writing data. Commands transmitted by the host 105 may be writing of data to the buffer or writing of data from the buffer to a magnetic tape 14.

Figure 2:
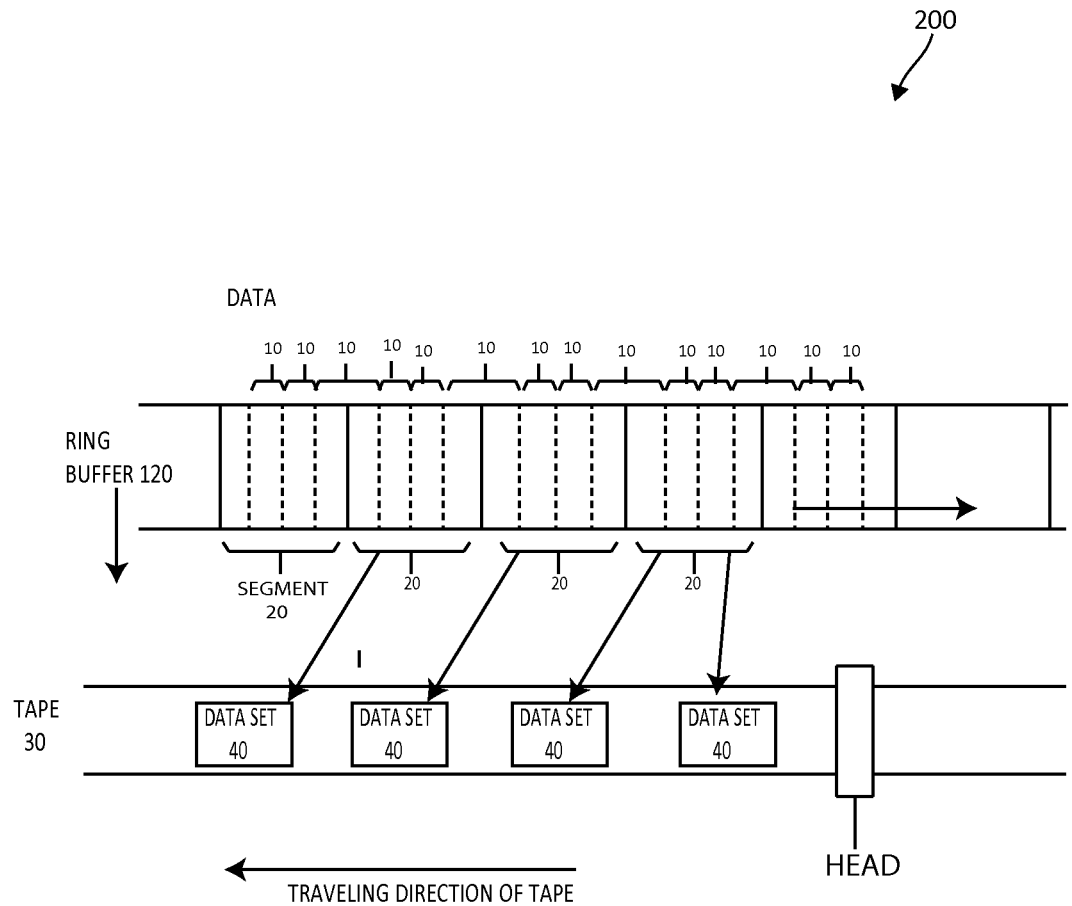
FIG. 2 is a block diagram of an exemplary embodiment illustrating correspondence between a buffer and data sets on a tape in which aspects of the present invention may be realized.

As noted above, various embodiments have two or more tape storage apparatuses, which may each be a tape drive 100. Communication between the two tape drives may be via any suitable connection, such as an Ethernet connection. The buffer 120 may be a memory for accumulating clusters of variable-length data 10 (see FIG. 2) to be written onto the tape 14a and may be Dynamic Random Access Memory (DRAM) or any other suitable memory, for storing data to be written to the tape 14 and for storing data read from the tape 14. The buffer 120 may be separated in fixed-length segments 20, as shown in FIG. 2. The data cluster 10 (see FIG. 2) with an arbitrary length is transferred from the host 105 to the drive. The data capacity of the segments 20 (see FIG. 2) may differ depending upon the size of the memory device, or devices, comprising the buffer 120 and the type of tape drive 100, among various other factors for example. An exemplary buffer 120 may comprise a plurality of segments 20 (see FIG. 2), with each segment 20 (see FIG. 2) configured to retain approximately 500K bytes of data. Alternatively each segment 20 (see FIG. 2) may have a data capacity of about 2 MB. The buffer 120 may function as a ring buffer, wherein data is stored into each segment 20 (see FIG. 2) sequentially and the ring buffer receives data up to the last segment and then starts to receive data from the first segment again, to be discussed thoroughly hereinafter. The buffer 120 is called a ring buffer in the sense that it receives data up to the last segment and then starts to receive data from the first segment again. One segment 20 (see FIG. 2) corresponds to one data set on the tape 14a or 30 (see FIG. 2). One data set 40 (see FIG. 2) may be constituted by a part of one data cluster or multiple data clusters sent from the host 105.

The writing/reading timing is when a segment is completely filled with data and when an area unfilled with data in a segment is filled by data padding in response to a synchronization request from the host. In this specification, these two cases in which a segment is filled with data may be expressed as a segment having been "prepared". With continued reference to FIG. 2, the tape 14a is a tape medium useful for recording data. Data transferred via the recording channel 130 is written onto the tape 14a by the head 14b as a data set 40 (see FIG. 2). The tape 14a is wound around the reels 14c and 14d, and laterally moves from the reel 14c toward the reel 14d, or vice versa accompanying their rotation.

The cartridge 14e may include a container for containing the reel 14c around which the tape 14a is wound. The same cartridge as the cartridge 14e may be provided to contain the reel 14d. The motor 150 rotates the reels 14c and 14d. The tape cartridge 14 is provided with a contactless nonvolatile memory called a cartridge memory (CM) 25 therein. The tape drive 100 contactlessly reads from and writes to the CM 25. The tape drive updates tape directory information (attribute information about written data) in the CM 25. When reading data, the tape drive refers to the information included in the CM 25 and moves the tape to a destination position at a high speed to enable alignment.

The controller 160 controls the whole tape drive 100. The controller 160 controls writing/reading of data to/from the tape 14a in accordance with a command received by the interface 110 from the host 105. The controller also controls the head position control system 170 and the motor driver 185. The head position control system 170 traces a desired one or multiple wraps, or sets of multiple tracks. When it becomes necessary for the head 14b to switch the track, the head position control system 170 performs control to electrically switch the head 14b. The motor driver 185 may be directly connected to the controller 160.

Using some of components of FIG. 1, FIG. 2 is a block diagram 200 of an exemplary embodiment illustrating correspondence between a buffer and data sets on a tape in which aspects of the present invention may be realized. As shown, FIG. 1 illustrates correspondence between a buffer 120 (see FIG. 1) and read data (data sets) on a tape 14 (see FIG. 1). A buffer 120 (see FIG. 1) is in the forth of a ring divided in fixed-length segments 20. Multiple variable-length data clusters 10 sent from a host a sequentially accumulated in a segment 20. The segment 20 may be completely filled with data read from a data set 40 of a tape 14. The data sets 40 are sequentially read from the tape 30 into each segment 20 of the buffer 120. Duplicate data or null data is prevented from being transferred from a host 105 by the controller 160 reading an end marker (not shown) of a dataset 40 that immediately precedes a dataset 40 with an invalidation flag. This may be either the first end marker of a dataset 40 immediately preceding a null dataset or the second end marker of a null dataset 40 immediately preceding a duplicate dataset 40.

In one embodiment, the buffer on tape drive is divided into datasets with a particular size. Each dataset unit is called segment. As mentioned above, a buffer consists of ring buffer (e.g., having a segment #0 up to a segment# N−1). When the dataset #n is read from tape, the image of dataset is stored in either of segment #x (e.g., 0<=x<=N−1). Next, when the dataset #n+1 is read from tape, the image of dataset #n+1 is stored in segment # (x+1) % N (where "%" means the modulo). In order to keep the small catalog at the BOP in the buffer as cache, the ring buffer is divided into 0 to #N−2 segments. Segment# N is reserved for cache. The small catalog (is stored at BOP) may be contained in 4 datasets from the BOP. When a dataset is read from tape, and is stored in segment #x, and the dataset number is from 1 to 4 (e.g., the dataset has a number which is assigned from one origin from the BOP) then microcode starts aggregating the image of dataset from the segment #x, #x+1, #x+2, #x+4, and on to segment #N as illustrated below in FIG. 3. It should be noted that FIG. 3 limits the number of multiple datasets for aggregation to 4, but this may be expanded based on user preference, and is only provided by way of example.

Figure 3:
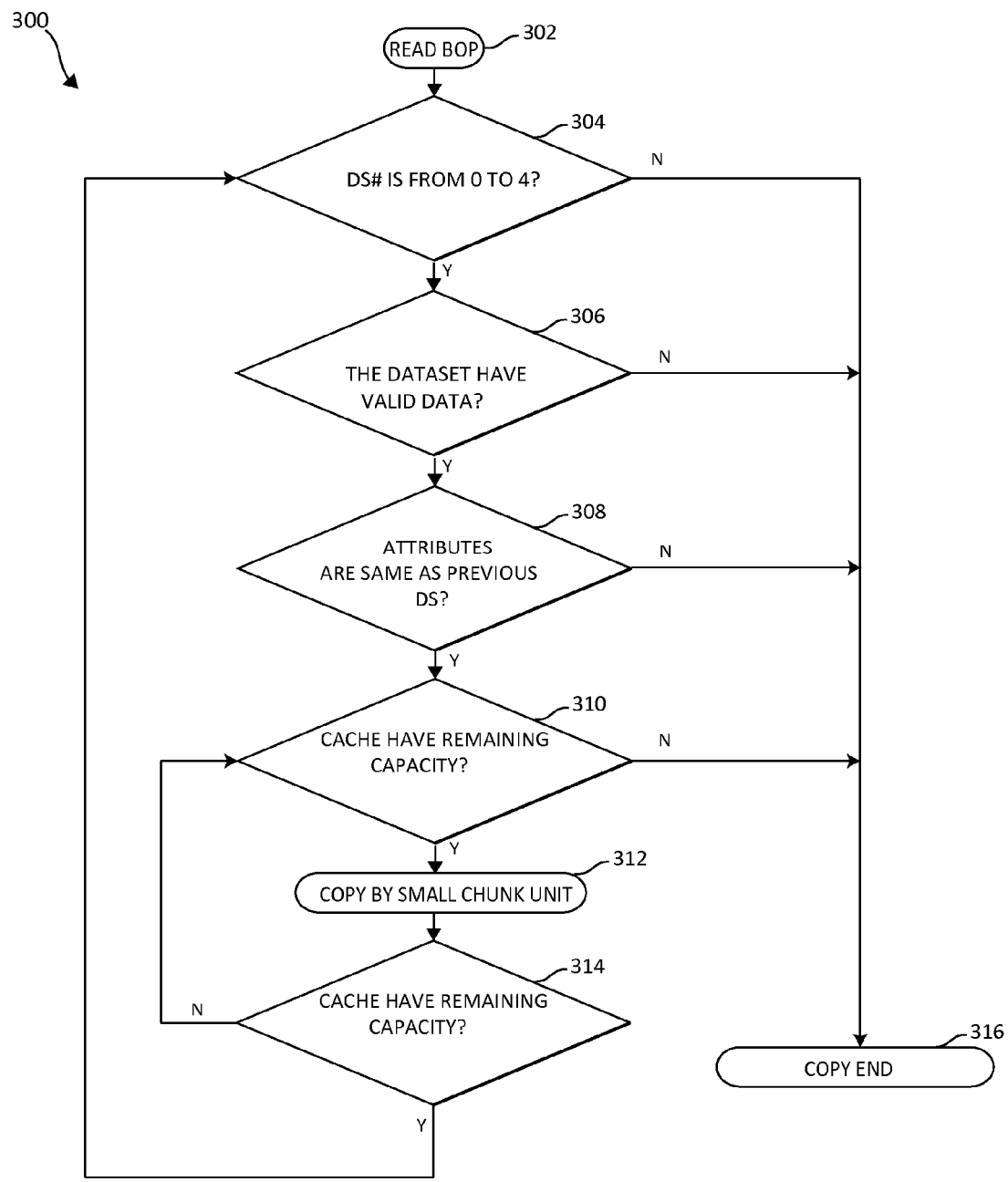
FIG. 3 is a flowchart illustrating an exemplary method for aggregating multiple datasets into a single data set which aspects of the present invention may be realized.

FIG. 3 is a flowchart illustrating an exemplary method 300 for aggregating multiple datasets into a single data set which aspects of the present invention may be realized. The method begins by reading a beginning of partition (BOP) (step 302). The method 300 determines the amount of multiple datasets (e.g., determines if the multiple datasets are from 0 to 4) (step 304). If there are not multiple datasets, the method 300 ends (step 316). If yes, the method 300 determines if the multiple dataset has valid data (step 306). If no, the method 300 ends (step 316). If yes, the method 300 determines if the attributes are the same as the previous multiple datasets (step 308). If no, the method 300 ends (step 316). If yes, the method 300 then determines if a cache has remaining capacity (step 310). If no, the method 300 ends (step 316). If yes, the method 300 copies the multiple datasets by a small chunk unit (step 312). The method 300 then determines if the end of the datasets has been reached (step 314). If no, the method 300 returns to step 310 and determines if a cache has remaining capacity (step 310). If yes, the method 300 returns to step 304, and the next dataset copy is started with the method determining the amount of multiple datasets (step 304).

Figure 4:
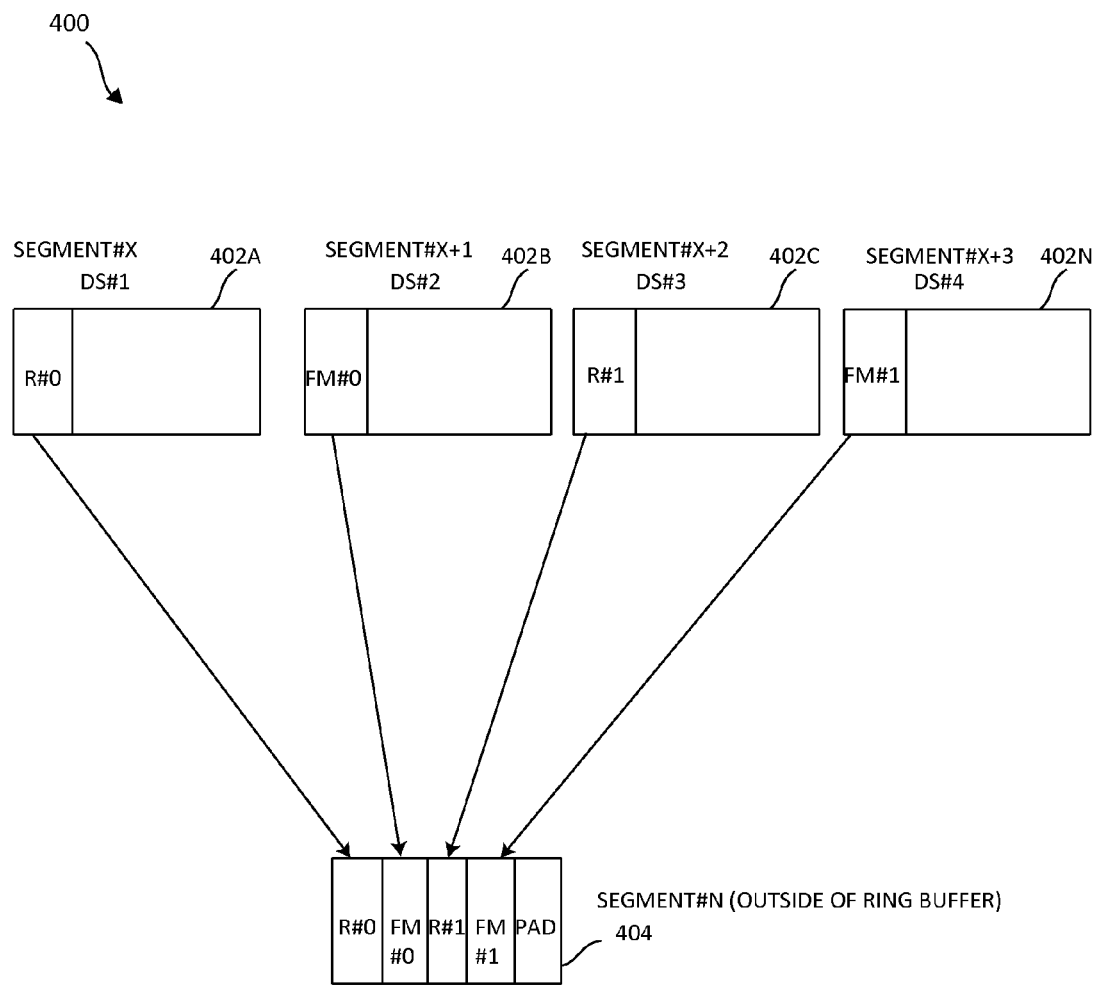
FIG. 4 is a block diagram of an exemplary embodiment for aggregating multiple datasets into a single data set which aspects of the present invention may be realized.

FIG. 4 is a block diagram 400 of an exemplary embodiment for aggregating multiple datasets into a single data set which aspects of the present invention may be realized. As illustrated in FIG. 4, segment #x (e.g., DS#1) 402a, segment #x+1

(e.g., DS#2) 402*b*, segment #x+2 (e.g., DS#3) 402*c*, and segment #x+4 (e.g., DS#4) 402*n* are shown having records and filemarks that are aggregated from multiple padded datasets and the records and filemarks are stored on the drive buffer as single dataset image (e.g into a single data segment). By way of example only, Segment #x (e.g., DS#1) 402*a* has a record labeled in FIG. 4 as R#0. Segment #x+1 (e.g., DS#2) 402*b* has a filemarker labeled in FIG. 4 as FM#0. Segment #x+2 (e.g., DS#3) 402*c* has a record labeled in FIG. 4 as R#1. Segment #x+4 (e.g., DS#4) 402*n* has a filemarker labeled in FIG. 4 as FM#1. These segments 404 are contained within the ring buffer (see FIG. 2).

However, the records R#0 and R#1 and the filemarks FM#0 and FM#1 are sequentially aggregated into at least one single data segment 404, outside of the ring buffer. The single data segment 404 is then padded (labeled in the single data segment 404 as "pad", but the padded data in the single data segment 404 is less than the padded data of the multiple datasets 402. In one embodiment, the records and filemarks are not aggregated into single datasets if the attributes for encryption data of each of the records are not the same. As mentioned above, if during the process of aggregating the records and the filemarks into the single data set, several of the records and the filemarks contain attributes that are different than the previous sequentially aggregated records and/or filemarks, than the present invention may aggregate the records and the filemarks having the different attributes for the encryption data into an alternative single data segment. Thus, each single data segment contains only the records and filemarks that are read from the multiple data sets, that have the same attributes (e.g., the same attributes of encryption). The present invention also aggregates only on read operations on the tape. Moreover, if the single data segment has reached a full capacity while aggregating, an additional single data segment may be added for continuing the aggregating the records and the filemarks.

Figure 5:
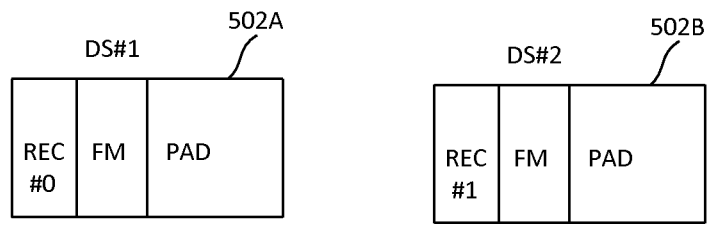
FIG. 5 is an additional block diagram of an exemplary sample embodiment for aggregating multiple datasets into a single data set which aspects of the present invention may be realized.
Figure 5:
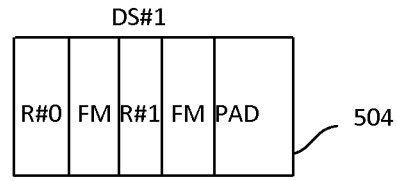

FIG. 5 is an additional block diagram of an exemplary sample embodiment for aggregating multiple datasets into a single data set which aspects of the present invention may be realized. As mentioned above, when a host writes/reads data to tape drive, the unit to be transferred to/from tape drive from/to host is recorded and is standardized by SCSI command. For a Linear Tape Open (LTO) format, multiple records are compressed and chunked to the fixed size unit=DS (DataSet) (e.g. 3 MB) to write/read to/from tape. The small catalog consists of 2 sets of 80 bytes record and filemark (filemark is a tag which is inserted by a Write Filemark command in SCSI). When the application writes a small catalog to the tape at the BOP, the application issues these 2 sets of records and filemarks by an SCSI write and Write Filemark (WriteFM) commands. The content of datasets to be written will be different by the option of Write Filemark command. Write Filemark command has the option (immediate and non-immediate). When non-immediate is specified, the tape drive flushes all of the unwritten data into a buffer. When immediate is specified, the filemark will be added followed by the previous record. In other words, the image of small catalog to be written to the tape will be varied by the option of the Write Filemark command. For example, consider the two following examples, as further illustrated in FIG. 5. Sample #1 502A and 502B:
Write 80 bytes, WriteFM 1 (non-immed), Write 80 bytes, WriteFM 1 (non-immed)<------------DS#1------------> <------------DS#2------------> <REC#0> <FM> <-------Pad------> <REC#1> <FM> <-------Pad------->
Sample #2 504:

Write 80 bytes, WriteFM 1(immed), Write 80 bytes, WriteFM 1(immed), WriteFM 0 (non-immed)<------------DS#1------------><REC#0> <FM> <REC#1> <FM> <--Pad->, where the "Pad" in the above illustration means padding, REC is record, and FM is a filemark. When a non-immediate option is specified, the tape drive needs to flush all of unwritten data to tape, even though DS is not fully filled by a record or filemark, since LTO formats need to write the dataset on tape. The sample #1 case means that a small catalog will be written to the DS#1 502A and DS#2 502B. A straight forward implementation of hardware is the buffer on the drive is divided by dataset size and it constructs a ring buffer, as described in FIG. 2. With this implementation, if the full image of datasets are kept, which contains the small catalog, then 2 times (e.g., 2 x's) the dataset size area is required on the drive buffer. There is a high penalty to keep 2 times (e.g., 2 x's) dataset in the drive buffer to maintain merely just 80 times 2 (e.g., 80*2) bytes and 2 times (e.g., 2 x's) filemark (1 filemark=4 bytes).

Thus, to improve the utilization of tape drive buffers, in one embodiment, the present invention provides a solution for improved utilization of tape drive buffers by aggregating records and filemarks into a single data segment 504 during read operations from multiple datasets 502A and 502B when multiple datasets are read from tape. The records and filemarks are aggregated from multiple padded datasets 502A and 502B and the records and filemarks are stored on the drive buffer as single dataset image 504. In other words, the records and the filemarks are sequentially aggregated into at least one single data segment. The single data segment is then padded, but the padding is less than the padded data of the multiple datasets. For example, if the end of the single data segment is padded, than the padding of the data in single data segment 504 is less than the padding of the records and the filemarks in the multiple data segments 502A and 502B. For example, the aggregation of the present invention described herein may be based on the LTO format. In one embodiment, the records and filemarks are not aggregated into single datasets if the attributes for encryption data of each of the records are not same.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for improving tape drive efficiency using a processor device, the method comprising:
aggregating records and filemarks, the aggregating restricted to being performed only on read operations, from a plurality of data segments into at least one single data segment, the records and the filemarks reorganized and restructured in the at least one single data segment such that buffer utilization is improved.

2. The method of claim 1, further including, sequentially aggregating the records and the filemarks into the at least one single data segment.

3. The method of claim 1, further including padding an end of the at least one single data segment, wherein the padding of the end of the at least one single data segment is less than padding of the records and the filemarks in the plurality of data segments.

4. The method of claim 1, wherein the aggregating the records and the filemarks further includes aggregating the records and the filemarks into the at least one single data segment for only the records and the filemarks having similar attributes.

5. The method of claim 4, further including aggregating the records and the filemarks having different attributes into an alternative one of the least one single data segment.

6. The method of claim 1, further including, if the at least one single data segment has reached a full capacity while aggregating, adding an additional one of the least one single data segment for continuing the aggregating the records and the filemarks.

7. The method of claim 1, further including aggregating the records and the filemarks into a drive buffer as the at least one single data segment.

8. The method of claim 1, further including aggregating the records and the filemarks having a similar attribute into the at least one single data segment.

9. A system for improving tape drive efficiency, the system comprising:
a tape,
the tape drive, in communication with the tape head,
a plurality of buffers in communication with the tape and the tape drive, and
a processor device, controlling the plurality of buffers, the tape, and the tape drive, wherein the processor device:
aggregates records and filemarks, the aggregating restricted to being performed only on read operations, from a plurality of data segments into at least one single data segment, the records and the filemarks reorganized and restructured in the at least one single data segment such that buffer utilization is improved.

10. The system of claim 9, wherein the processor device sequentially aggregates the records and the filemarks into the at least one single data segment.

11. The system of claim 9, wherein the processor device pads an end of the at least one single data segment, wherein the padding of the end of the at least one single data segment is less than padding of the records and the filemarks in the plurality of data segments.

12. The system of claim 9, wherein the processor device aggregates the records and the filemarks into the at least one single data segment for only the records and the filemarks having similar attributes.

13. The system of claim 12, wherein the processor device aggregates the records and the filemarks having different attributes into an alternative one of the least one single data segment.

14. The system of claim 9, wherein the processor device, if the at least one single data segment has reached a full capacity while aggregating, adding an additional one of the least one single data segment for continuing the aggregating the records and the filemarks.

15. The system of claim 9, wherein the processor device aggregates the records and the filemarks into a drive buffer as the at least one single data segment.

16. The system of claim 9, wherein the processor device aggregates the records and the filemarks having a similar attribute into the at least one single data segment.

17. A computer program product for improving tape drive efficiency by a processor device, the computer program product comprising a non-transitory computer-readable storage medium having computer-readable program code portions stored therein, the computer-readable program code portions comprising:
a first executable portion that aggregates records and filemarks, the aggregating restricted to being performed on only read operations, from a plurality of data segments into at least one single data segment, the records and the filemarks reorganized and restructured in the at least one single data segment such that buffer utilization is improved.

18. The computer program product of claim 17, further including a second executable portion that sequentially aggregates the records and the filemarks into the at least one single data segment.

19. The computer program product of claim 17, further including a second executable portion that pads an end of the at least one single data segment, wherein the padding of the end of the at least one single data segment is less than padding of the records and the filemarks in the plurality of data segments.

20. The computer program product of claim 17, further including a second executable portion that aggregates the records and the filemarks into the at least one single data segment for only the records and the filemarks having similar attributes.

21. The computer program product of claim 20, further including a third executable portion that aggregates the records and the filemarks having different attributes into an alternative one of the least one single data segment.

22. The computer program product of claim 17, further including a second executable portion that, if the at least one single data segment has reached a full capacity while aggregating, adding an additional one of the least one single data segment for continuing the aggregating the records and the filemarks.

23. The computer program product of claim 17, further including a second executable portion that aggregates the records and the filemarks into a drive buffer as the at least one single data segment.

24. The computer program product of claim 17, further including a second executable portion that aggregates the records and the filemarks having a similar attribute into the at least one single data segment.

* * * * *